United States Patent [19]

Tomko et al.

[11] Patent Number: 5,541,994
[45] Date of Patent: Jul. 30, 1996

[54] FINGERPRINT CONTROLLED PUBLIC KEY CRYPTOGRAPHIC SYSTEM

[75] Inventors: George J. Tomko, East York; Colin Soutar; Gregory J. Schmidt, both of Toronto, all of Canada

[73] Assignee: Mytec Technologies Inc., Don Mills, Canada

[21] Appl. No.: 301,677

[22] Filed: Sep. 7, 1994

[51] Int. Cl.$^6$ ....................................... H04K 1/00
[52] U.S. Cl. ................... 380/30; 380/54; 380/21
[58] Field of Search ...................... 380/30, 54, 21

[56] References Cited

U.S. PATENT DOCUMENTS

| 5,095,194 | 3/1992 | Barbanell | 235/379 |
| 5,138,468 | 8/1992 | Barbanell | 359/2 |

OTHER PUBLICATIONS

"The Mathematics of Public–Key Cryptography", Martin E. Hellman, *Scientific American* Aug. 1979, pp. 146 to 157.

*Primary Examiner*—David C. Cain
*Attorney, Agent, or Firm*—Merchant, Gould, Smith, Edell, Welter & Schmidt, P.A.

[57] ABSTRACT

A public key cryptographic system is implemented as follows. In an enrolment apparatus, the unique number for use in generating the public key and private key of the system is generated by manipulation of fingerprint information of a subscriber. A filter is then generated which is a function both of the Fourier transform of the subscriber's fingerprint(s) and of the unique number. This filter is stored on a subscriber card. When the subscriber wishes to generate his public or private key, he inputs his card to a card reader of an apparatus and places his finger(s) on a fingerprint input. The apparatus generates an optical Fourier transform from the fingerprint input. The Fourier transform signal is incident on to a spatial light modulator programmed with the filter information from the card. An inverse transform is generated from the filtered signal and this is used to regenerate the unique number. The apparatus also has a subsystem for utilizing the private key to decrypt an input encrypted message.

17 Claims, 3 Drawing Sheets

FINGERPRINT CONTROLLED PUBLIC KEY CRYPTOGRAPHIC SYSTEM

BACKGROUND OF THE INVENTION

1. Field of the Invention

This invention relates to a public key cryptographic system.

2. Description of the Related Art

In a public key cryptosystem, a plain text message may be encrypted by inputting the message and an enciphering key to an encryption algorithm. To decipher the message, the encrypted message is input to the inverse of the same algorithm along with a deciphering key. As with many encryption techniques, the encryption algorithm effects transformations of the plain text message which are so complicated it is computationally infeasible to reverse the process even if the algorithm is known. A peculiarity of public key systems is that it is also computationally infeasible to determine the deciphering key from the enciphering key. Consequently, in a public key cryptosystem, both the algorithm and the enciphering key may be made available to the public without jeopardising the security of a message enciphered with the enciphering key. Hence the term "public key" for the enciphering key. The deciphering key, which is confidential, is known as a "private key". With a public key system, anyone who wishes to receive encrypted messages may make an encryption algorithm and a public key freely available. Moreover, some public key systems allow the transmission of a "digital signature" that prevents forgery of messages by a receiver as well as a third party.

By way of example, with the known "knapsack" cryptosystem, a public key is derived from a private key utilising modular arithmetic. Each element in the array (vector) forming a private key is multiplied by a large prime number, x, and divided by a second large prime number, y. The corresponding element of the public key vector is the remainder from this operation. In order to encrypt a plain text message, the message is digitised and the digital string grouped into arrays (vectors) each having the same number of elements as the number of elements in the array which comprises the public key. The encrypted message is formed from the vector dot product of the public key vector with each vector formed from the digitised plain text message.

Clearly the exemplary encryption technique and the technique for deriving a public key from a private key make it computationally infeasible to determine either the private key or the plain text message even though the algorithm, along with the encrypted text, is known. There are, however, known techniques for structuring a private key vector such that, with it, the plain text can be rapidly derived from an encrypted message. Two sample techniques in this regard are described in an article entitled "The Mathematics of Public-Key Cryptography" *Scientific American* August 1979, pages 146 to 157.

The problem with such public key cryptograph systems is that, in use, they require a secure, yet readily available, private key. The private key has to either be remembered, which is not practical, or stored in a secure place and retrieved. The security of storage therefore is at best dependent on password access which itself can be compromised.

This invention seeks to overcome drawbacks of the known prior art and provide an extremely secure private key which is not even known by the user yet is readily accessible.

SUMMARY OF THE INVENTION

According to the present invention, there is provided a public key cryptographic system, comprising: a body part input for generating an optical information signal impressed with characteristics of a body part; Fourier transform means along a path of said optical information signal to obtain a Fourier transform representation of said information signal; a programmable filter responsive to said Fourier transform means for filtering said Fourier transform representation of said information signal to obtain a filtered Fourier transform representation; means for reading data from a data carrier storing filter information and for programming said programmable filter with said filter information data; inverse transform means responsive to said filter to inverse Fourier transform said filtered Fourier transform representation to obtain an inverse transform representation; key generating means responsive to said inverse transform means for generating a private key for decrypting a public key encrypted message.

According to another aspect of this invention, there is provided a method for generating a private key for use in decrypting a public key encrypted message, comprising the steps of: generating an optical information signal impressed with characteristics of a body part; obtaining a Fourier transform representation of said information signal; receiving a filter and filtering said Fourier transform representation of said information signal with said filter to obtain a filtered Fourier transform representation; obtaining an inverse Fourier transform representation of said filtered Fourier transform representation; generating a private key from said inverse transform representation for decrypting a public key encrypted message.

BRIEF DESCRIPTION OF THE DRAWINGS

In the figures which disclose example embodiments of the invention.

DESCRIPTION OF THE PREFERRED EMBODIMENTS

In the following, lower case letters represent functions in the "spatial domain" and upper case letters represent the "Fourier transformed frequency domain". Also, we use the following terminology: "Fourier transform" denotes a transformation from the spatial domain to the frequency domain, and "inverse Fourier transform" denotes a transformation from the frequency domain to the spatial domain. It should be noted that when the inverse Fourier transform is implemented optically (using a lens), the transformation is in fact equivalent to the Fourier transform. The consequence of this is that a coordinate reversal occurs in the resulting spatial domain. On the other hand, digital implementation of the inverse Fourier transform can be accomplished as mathematically defined, and so no such coordinate reversal occurs. However, both (optical and digital) implementations of the inverse Fourier transform can be used to produce the correlation operation which is required for this invention.

Figure 1:
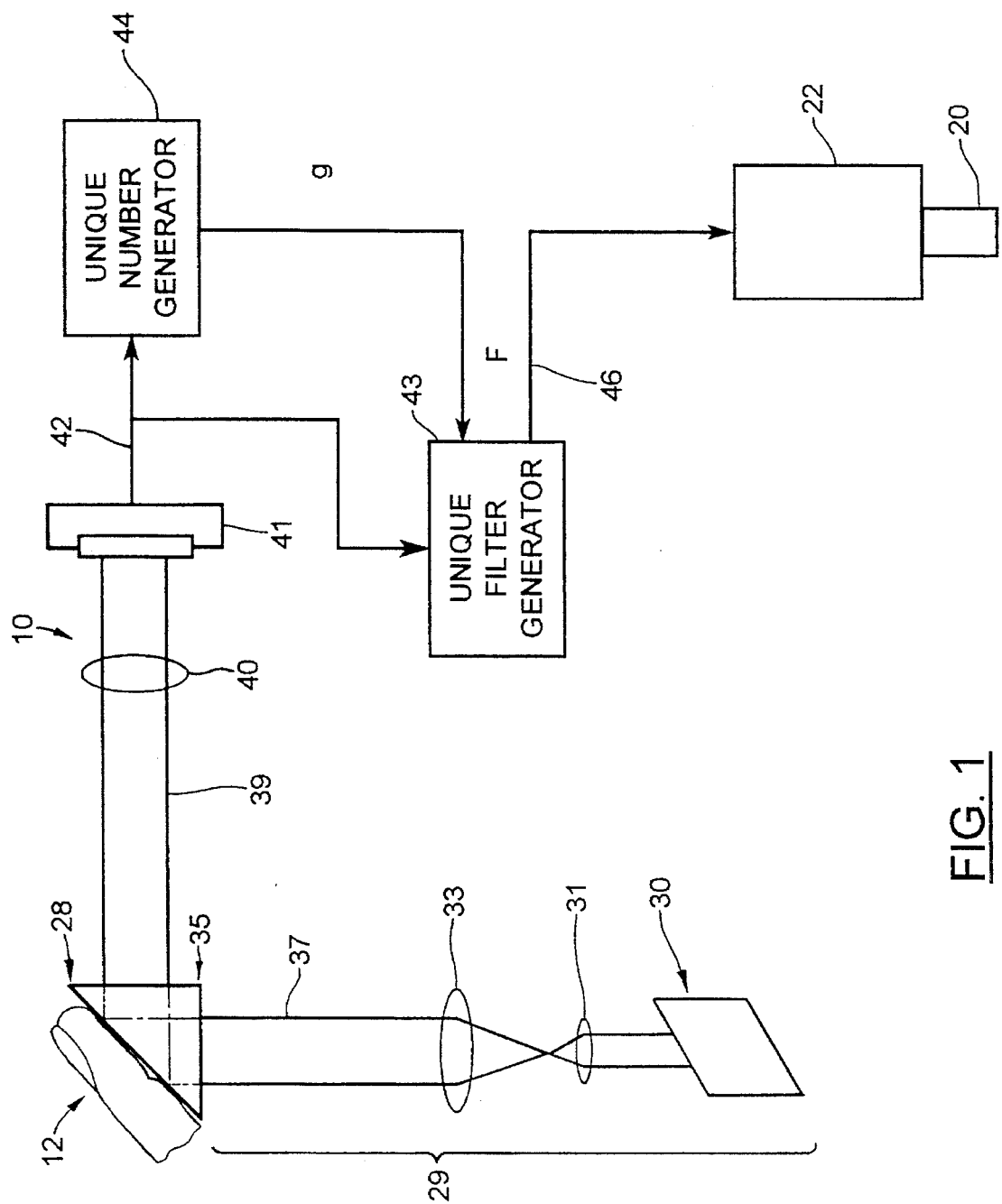
FIG. 1 is a schematic diagram of an enrolment apparatus made in accordance with this invention.

An individual who wishes to use the encrypting and decrypting apparatus of this invention is enroled by way of enrolment apparatus 10 of FIG. 1. With reference to FIG. 1, enrolment apparatus 10 comprises an input system 29 with a light source 30, which may be a coherent source, an expander lens 31, and a collimator lens 33 to illuminate a prism 35 with a beam 37. One face of the prism forms an input screen 28. The individual to be enroled places a finger (or fingers) 12 on the input screen. The input system utilizes the principle of total internal reflection to read the pattern formed by the furrows of the input fingerprint pattern. That is, a furrow will create an air space over the surface of a glass screen, allowing light which is internally reflected from the interior surface of the screen to proceed unimpeded. Ridges, however, will be in contact with the surface, where they will scatter and absorb a portion of the illuminating light. This effect is known as frustrated total internal reflection. In the result, the output beam 39 from the prism is an information beam carrying the fingerprint pattern, p. The optical beam 39 inputs a lens 40 which images the fingerprint information onto an Image Capture and Digitizer Device ICDD, 41, comprising a light detector array, an A/D converter and a processor. The ICDD converts the optical fingerprint information beam into a two-dimensional grey scale digital representation. The digital output 42 of the ICDD is input to a unique filter generator 43 and to a unique number generator 44.

The unique number generator 44 generates an array of numbers. This may be accomplished in any of a number of ways. For example, a Fourier transform of the fingerprint information may be calculated to obtain the Fourier transform co-efficients of the transform. Selected ones of these Fourier transform co-efficients may then be chosen and combined to generate a number u. It will be apparent that this number u is unique to the particular fingerprint(s) placed on me input screen. Alternatively, u can be generated by a random number generator seeded with the selected Fourier transform co-efficients. The unique number u is then used to generate an array of numbers $g=\{g_1, \ldots g_n\}$ such that the values in the elements of g represent the unique number u. For example, if u is a k-digit base 10 number and if in any subsequent measurement of the values $g_1 \ldots g_n$, the detecting instrument will have a known error in detection which only allows $\beta$ distinct values from 0 to m−1 inclusive (m is the dynamic range of the detector), n would be chosen to be the integer greater than or equal to $\log_\beta 10^k$. The unique number u can then be expanded into elements of g by using modulo division, i.e.:

$$g_1 = \text{Integer of } \frac{u}{\beta^{n-1}}$$

$$g_2 = \text{Integer of } \frac{u \bmod \beta^{n-1}}{\beta^{n-2}}$$

$$g_3 = \text{Integer of } \frac{(u \bmod \beta^{n-1}) \bmod \beta^{n-2}}{\beta^{n-3}} = \text{Integer of } \frac{u \bmod \beta^{n-2}}{\beta^{n-3}}$$

etc. The array, g, is input to the unique filter generator 43.

The unique filter generator 43 calculates the digital Fourier transform, P, of the fingerprint information and generates a two dimensional filter function, F, as follows. The mathematical multiplication of the fingerprint transform, P, with the filter, F, produces the two-dimensional light distribution S. F is generated so that the inverse Fourier transform of S, denoted by s, is equal to a series of n displaced delta-like functions $\delta_1, \beta_2, \ldots \delta_n$, where the square of the amplitude of $\delta_i$ is equal to the corresponding value $g_i$ in the array g. This may be represented mathematically by the following sets of equations which for convenience will be described in one dimension:

Let p(x) be the input fingerprint pattern signal P(u) be the complex Fourier transform of the signal, denoted by $|P(u)|\exp(j\phi(u))$, where $\phi(u)$ is the phase of the Fourier transform F(u) be the filter function
and s(x) be the output signal
We desire s(x) to have the following form:

$$s(x) = \sqrt{g_1} \cdot \delta(x-x_1) + \sqrt{g_2} \cdot \delta(x-x_2) + \ldots \sqrt{g_n} \cdot \delta(x-x_n)$$

that is n delta functions at positions $x_1, x_2, \ldots x_n$ and relative intensities $g_1, g_2, \ldots g_n$ respectively
Then, $$S(u) = \int \sqrt{g_1} \cdot \delta(x-x_1) \cdot \exp(-j2\pi ux) dx +$$
$$\int \sqrt{g_2} \cdot \delta(x-x_2) \cdot \exp(-j2\pi ux) dx + \ldots$$

Let $x' = x - x_1$, $x'' = x - x_2$, etc.

$$S(u) = \int \sqrt{g_1} \cdot \delta(x') \cdot \exp(-j2\pi u(x'+x_1)) dx' +$$
$$\int \sqrt{g_2} \cdot \delta(x'') \cdot \exp(-j2\pi u(x''+x_2)) dx'' + \ldots$$
$$= \sqrt{g_1} \cdot \exp(-j2\pi ux_1) \cdot \int \delta(x') \cdot \exp(-j2\pi ux') dx' +$$
$$\sqrt{g_2} \cdot \exp(-j2\pi ux_2) \cdot \int \delta(x'') \cdot \exp(-j2\pi ux'') dx'' + \ldots$$
$$= \sqrt{g_1} \cdot \exp(-j2\pi ux_1) + \sqrt{g_2} \cdot \exp(-j2\pi ux_2) + \ldots$$

We require that $$P(u) \cdot F(u) = S(u)$$

Thus, $F(u) = \frac{S(u)}{P(u)}$

That is, $$F(u) = \frac{\sqrt{g_1} \cdot \exp(-j2\pi ux_1) + \sqrt{g_2} \cdot \exp(-j2\pi ux_2) + \ldots \sqrt{g_n} \exp(-j2\pi ux_n)}{|P(u)|\exp(j\phi(u))}$$
$$= \frac{\exp(-j\phi(u))}{|P(u)|} \cdot [\sqrt{g_1} \exp(-j2\pi ux_1) + \sqrt{g_2} \exp(-j2\pi ux_2) + \ldots ]$$

In general $|P(u)|=0$ will occur for some values of u, resulting in singularities in the above expression for F(u). This problem is usually eliminated by imposing a magnitude constraint on F(u), such that $$F(u) = \begin{cases} \frac{\alpha \exp(-j\phi(u))}{|P(u)|} \cdot [\sqrt{g_1} \exp(-j2\pi ux_1) + \\ \sqrt{g_2} \exp(-j2\pi ux_2) + \ldots ] \text{ for } |P(u)| \geq \alpha \\ \exp(-j\phi(u)) \cdot [\sqrt{g_1} \exp(-j2\pi ux_1) + \\ \sqrt{g_2} \exp(-j2\pi ux_2) + \ldots ] \text{ otherwise} \end{cases}$$

where $\alpha$ is a constant that ensures that $|F(u)|$ is normalized.

This complex-valued filter function, F, will be implemented on the available spatial light modulator using the methods described in the article "Optimal realizable filters and the minimum Euclidean distance principle," Richard D. Juday, Applied Optics, Vol. 32 pages 5100–5111 (1993), or by other such methods.

One knowledgeable in the art can easily extend this to two dimensions. The unique filter generator outputs the values of the filter F to card storage device 22 on line 46. The card storage device stores filter F on a storage medium (such as a magnetic strip or smart card chip) of a card 20. Once this operation is accomplished, enrolment is complete and the individual leaves with card 20.

Figure 2:
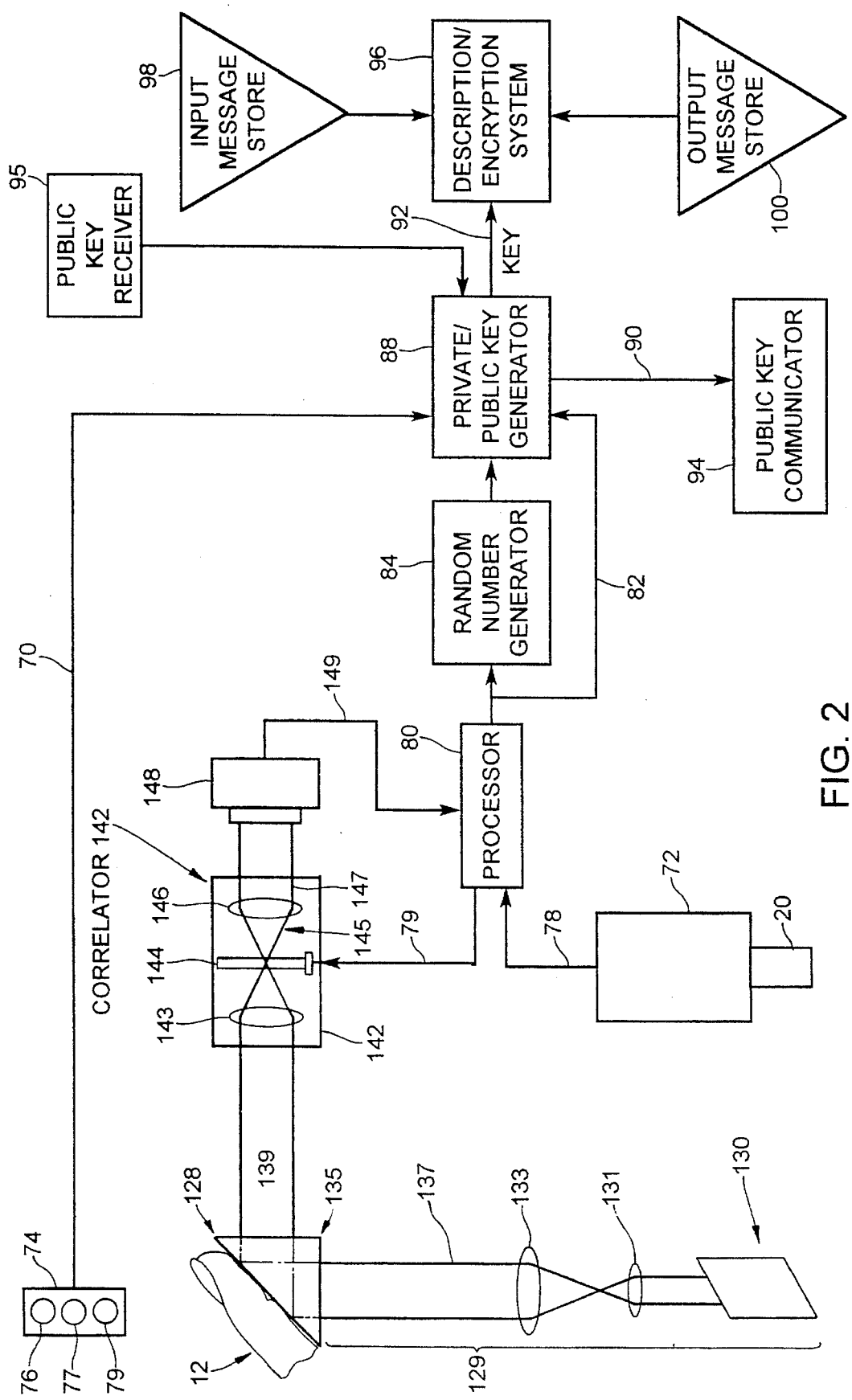
FIG. 2 is a schematic diagram of an encrypting/decrypting apparatus made in accordance with this invention.

A subscriber may communicate his public key or decrypt a message utilizing apparatus 70 of FIG. 2. Further, another may encrypt a message with apparatus 70.

Turning to FIG. 2, apparatus 70 comprises an input system 129 with a laser 130, expander lens 131, collimator lens 133, and prism 135 which may be similar to the input system 29 of FIG. 1. A correlator 142 is in the information beam path 139. The correlator comprises a Fourier transforming lens 143, an electronically addressable (programmable) spatial light modulator (SLM) 144 in the back focal plane of lens 143, and an inverse Fourier transform lens 146. The output beam 147 from the correlator inputs optical detector 148. Detector 148 inputs processor 80 on line 149. The processor also receives an input from card reader 72 on line 78. The processor outputs to the SLM 144 on line 79, to a pseudo-random number generator 84, and to a public/private key generator 88 on line 82. The pseudo-random number generator outputs to the public/private key generator which, in turn, outputs to a public key communicator 94 and, on line 92, to a decryption/encryption system 96. The public/private key generator also receives an input from public key receiver 95 and from keypad 74. The decryption/encryption system receives an input from an input message store 98 and outputs to an output message store 100.

A subscriber who wishes to transmit his public key places the same finger or fingers on the input screen 128 as were placed on the screen 28 (FIG. 1) during enrolment, his card 20 in reader 72, and presses button 76 of keypad 74. This activates light source 130 and the resulting output beam 139 from the prism is an information beam carrying the fingerprint pattern p'. The beam 139 carrying the spatial fingerprint information proceeds into the correlator 142 and passes through the Fourier transform lens 143. The filter information, F, stored on card 20 is read by reader 72 and input to processor 80. The processor converts the incoming digital filter information signals to analog SLM drive voltages. These drive voltages, which represent the filter information, are transferred into the SLM 144 on line 79. The filter written on the SLM 144 modulates the fingerprint's optical transform through a multiplicative method which is part of the optical correlation operation which compares the subscribers fingerprint(s) with those represented by the encoded filter F stored on the subscriber's card. The output from the SLM 144 is an optical signal S' whose similarity to the transform function S depends on the degree of correlation between the input fingerprint(s) p' and the reference fingerprint(s) p used to construct the filter F. If p and p' are the same fingerprint(s) then S' equals S. The optical signal 145 which comprises S' passes through the second transform lens 146 and onto the optical detector 148 where its intensity distribution s' is detected. When p' equals p then s' will be an intensity distribution representing g, the array of numbers which represent the unique number u. The output of the optical detector 148 inputs the processor 80 which calculates the unique number u from the array of numbers $\{g_1, \ldots g_n\}$. If the error in detection by detector 148 only allows distinct values between 0 and m−1 inclusive, where m is the dynamic range of the optical detector 148, we calculate:

$$g_i^* = g_i(\text{measured}) \cdot \frac{\beta}{m} \text{ and round to integers}$$

where $0 \leq g_i^* < \beta$.

Then $u = g_1^* \beta^{n-1} + g_2^* \beta^{n-2} + \ldots + g_n^* \beta^0$

The number u then acts as the seed number which inputs pseudo-random number generator 84. It is important to note that the pseudo-random number generator will generate the same random numbers whenever it is input with the same seed, in this case u. The random numbers derived by pseudo-random number generator 84 as well as u itself, on line 82, input the key generator 88. The key generator utilizes known public-key cryptographic techniques to derive a private key or a public key from these inputs. With button 76 of keypad 74 depressed, the key generator is prompted to output the public key on line 90 to public key communicator 94. Communicator 94 may simply be a display or it could be a transmitter such as a modem which transmits the number to a sendee.

If a subscriber has an encrypted message he wants to decipher, he may utilize apparatus 70 to decrypt same, as follows. The encrypted message is input to input message store 98. Then the subscriber (receiver) inserts his card 20 in card reader 72, depresses button 79 of keypad 74, and places his finger(s) on input screen 128. As before, the processor 80 generates the unique number u from the intensity distribution s' and this, along with the random numbers generated by random number generator 84 in response to the seed number u, input the key generator 88. In response to the prompt from button 79, the key generator utilizes these inputs to derive the private key. The private key then inputs decryption/encryption system 96 on line 92; the encrypted message stored in the input message store 98 also inputs system 96. The system 96 utilizes known public key cryptographic techniques to decrypt the message from these inputs. The decrypted message is then output to output message store 100 where it may be accessed by the subscriber.

If the person using apparatus 70 was not the person whose fingerprints were represented by the encoded filter F, then the optical signal S' derived from the multiplication of the filter F from the card with the Fourier transform P' of that persons fingerprint(s) will not equal S. This will mean that the unique number u' indirectly derived from S' will not be equivalent to u. Consequently the key generated by the private/public key generator 88 will not decrypt the encrypted message.

An individual may send a subscriber an encrypted message utilizing apparatus 70 in the following manner. The individual stores a plain text message in input message store 98, depresses button 77 of operator input 74 and inputs the public key of the subscriber to public key receiver 95. This prompts the key generator 88 to directly input the public key from public key receiver 95 to the decryption/encryption system 96. The system 96 uses this key in encrypting the plain text message and outputs the encrypted message to output message store 100. The individual may then transmit the encrypted message to the subscriber in any non-secure manner. (It may be noted that the fingerprint and card reading subsystems of apparatus 70 are inactive when button 77 is pressed.)

It will be apparent that the system of this invention allows the use of public key encryption techniques without a subscriber knowing his private key. This enhances the security of the system. Yet further, a lost card could not be used by a third party in apparatus 70 because the unique number u is only recoverable by inputting the subscriber's fingerprint.

Another advantage of the subject system is that the subscriber need not know his public key as it may be easily generated with the system of the invention. Furthermore, if an unauthorized individual broke in to an apparatus 70 of FIG. 2, he would have no way of determining the manner for generation of u since this number is only generated in the enrolment devices of FIG. 1 and is unique to each individual.

The robustness of the system of the present invention may be enhanced as follows. In the enrolment apparatus 10 of FIG. 1, the absolute value of one point of $g=\{g_1, \ldots g_n\}$, for example $g_1$, may be stored on card 20. If this is done, then the processor circuit 80 of FIG. 2 may compare the intensity of this same point in the g function generated by optical correlator 142 with that point stored on the card and scale the elements of g from correlator 142 accordingly. This will reduce the effect of the "noise" present in apparatus 70. For example, dirt or oil on the input screen 128 could reduce the absolute intensity of g. However, the relative intensities of the delta functions would be preserved. The absolute value could then be recovered by comparing one point of g generated by correlator 142 with that same point of g which is stored in absolute form on card 20.

In another embodiment of the invention, the unique number, u, is related to the location of peaks in the correlator output, rather than their relative intensities as considered so far. In this embodiment the filter F is designed to produce a series of equal-intensity peaks at the correlation plane detector. The peak locations are carefully controlled so that they occur within a grid of p by q cells on the detector. When n such series of peaks are displayed sequentially, the unique number u can be reproduced, using only the peak location information.

In this embodiment an individual will be enroled using the following procedure. With reference to FIG. 1, the individual will place their finger(s) on the input screen 28. As before, the fingerprint information is input to the ICDD 41. The digital output 42 of the ICDD is input to the unique filter generator 43 and to the unique number generator 44. The unique number generator 44 will assign the subscriber a unique number u as previously described. Then, the unique number generator 44 determines an array b which is related to the unique number u by the following relationship:

$$u = f(b, w)$$

where w is a constant for any specified number of peaks (t) and size of grid (p by q) as described hereinafter. For reasons which will also be apparent hereinafter, a convenient choice for the function is:

$$u = b_1 w^{n-1} + b_2 w^{n-2} + \ldots + b_{n-1} w^1 + b_n w^0$$

Thus, the coefficients $b_1, b_2 \ldots b_n$ which determine the unique number u can be evaluated using modular arithmetic as follows:

$$b_1 = \text{Integer of } \frac{u}{w^{n-1}}$$

$$b_2 = \text{Integer of } \frac{u \bmod w^{n-1}}{w^{n-2}}$$

.
.
.

$$b_{n-1} = \text{Integer of } \frac{u \bmod w^2}{w^1}$$

$$b_n = \text{Integer of } \frac{u \bmod w^1}{w^0}$$

The unique number generator 44 then assigns each value of $b_i$ to one of the possible permutations of arranging t peaks in a grid of p by q cells. One of the peaks is always located in the upper left cell of the grid, to serve as a reference peak. The number of permutations of locating the remaining t−1 peaks in the p·q−1 cells is given by w, where:

$$w = \frac{(p \cdot q - 1)!}{(t-1)!(p \cdot q - t)!}$$

Thus, it is clear that each coefficient $b_i$ has a value between 0 and w−1 inclusive. The assignment of the value of $b_i$ to a particular pattern of peak locations is accomplished by using a randomised look-up table in the filter generator which relates every possible value of $b_i$ (i.e. from 0 to w−1) to a unique permutation of peak locations in the grid. Thus, a two-way relationship between the value of $b_i$ and the relative locations of peaks in the grid is established. Clearly then, if the subscriber can later reproduce the pattern of peaks in such a grid using the apparatus 70 of FIG. 2, then the unique number u can be regenerated and thus the subscriber can proceed. Note however, that because of the randomised look-up table, even if a pattern of peaks were discerned, it would bear no relationship to the corresponding value of the element of b unless the look-up were known.

Figure 3:
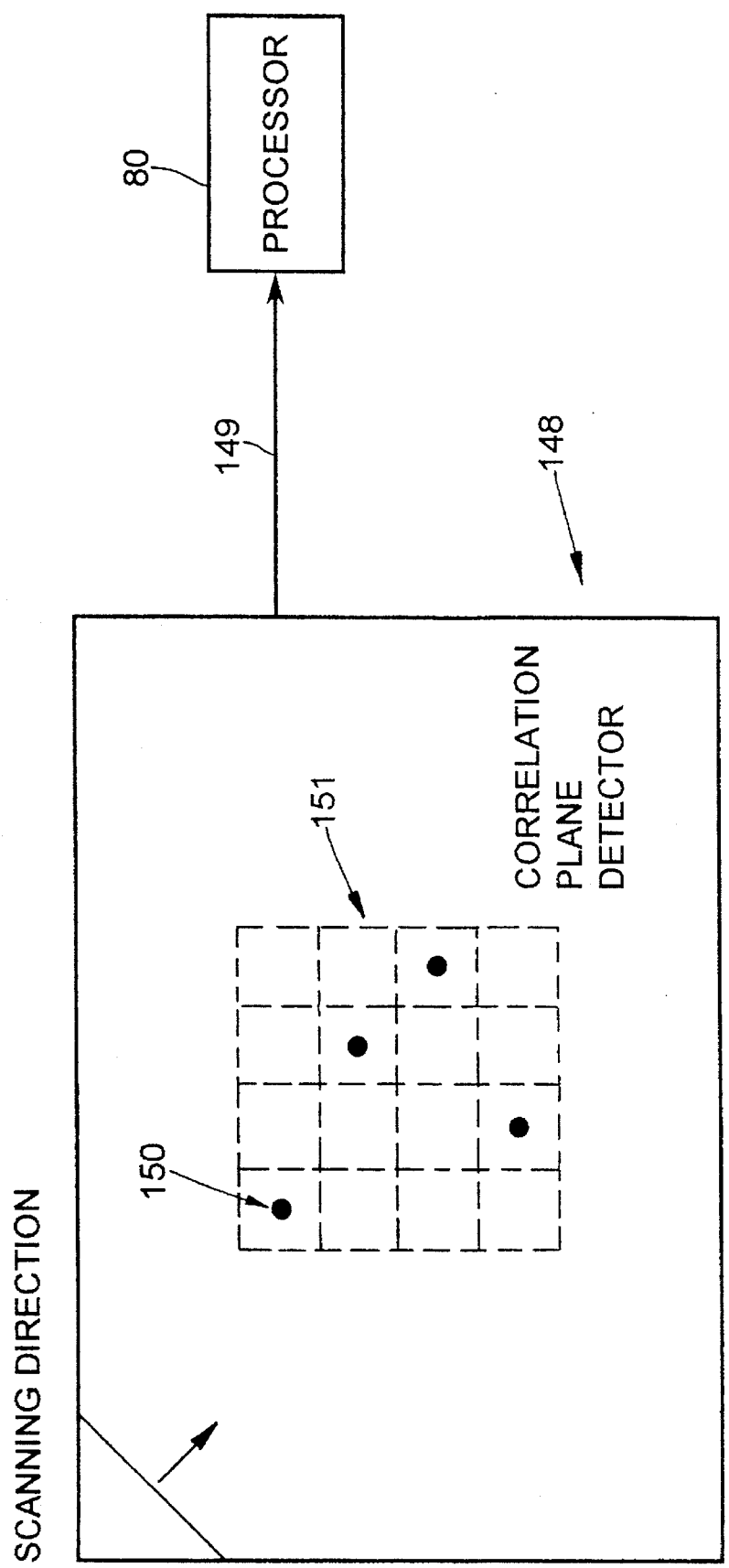
FIG. 3 is a schematic diagram of a portion of FIG. 2.

The required locations of the peaks for each element, $b_i$, of b are input to the unique filter generator from the unique number generator. The unique filter generator calculates the filter, $F_i$, so that when the correct fingerprint (or fingerprints), p, is input to apparatus 70 of FIG. 2, the output function, % is the specified arrangement of equal-intensity peaks. This calculation uses the Fourier transform of the subscriber's fingerprint(s), P, and the same approach as described previously, with the exception that all of the delta-like functions are assigned the same peak height, and their relative locations are determined by $b_i$. (Therefore, in one dimension, $$s_i = \delta(x-x_1) + \delta(x-x_2) + \ldots + \delta(x-x_t)$$

where $x_1, x_2, \ldots, x_t$ are determined by the look-up table of peak locations for $b_i$.) Note that n such filters, $F_1, F_2, \ldots F_n$, corresponding to $b_1, b_2, \ldots b_n$, will be required to determine all the elements of b. The n filters are generated in this manner, and are then stored on the card 20. Thus, the enrolment process is completed and the user retains the card 20.

Where the subscriber to the system wishes to regenerate the unique number, u, to produce the private or public key, the following procedure is adopted. Turning to FIG. 2, when a subscriber places his finger(s) on the input 128 of apparatus 70, inserts his card 20 in the reader 72, and presses button 76 (to display his public key) or 79 (to decrypt a message), the processor causes the n filters from the card 20 to be transferred sequentially to the SLM 144 on line 79. A given filter, $F_i$, is multiplied in the correlator 142 with the Fourier transform, P, of the subscriber's fingerprint(s). The inverse Fourier transform of the result, which is the function $s_i$, is displayed on the correlation plane detector 148. With reference to FIG. 3, which schematically illustrates a portion of FIG. 2, the location of the first peak 150 in the detector 148 is determined by scanning across the detector from upper left to the bottom right. This first peak is considered to be the reference peak, and its position defines the grid 151 of p by q detection cells in the correlation plane detector, with the reference peak occupying the upper left cell in this grid. The detector output is then scanned over the area of the grid 151 and the locations of the other t−1 peaks are determined. Each of the t−1 peaks occupies a unique cell in the grid and the position of each is communicated to the processor 80 on line 149. The processor determines the element $b_i$ of the vector b from the pattern of peaks by referring to the same randomised look-up table as used in the unique filter generator 43. The next filter, $F_i$, is then written to the SLM and thus the next element of b is determined and so on, until the entire array, b, is generated.

Since each element $b_i$, will have w possible values, $b_i$, is, in effect, a number in base w. It is for this reason that $$u=f(b,w)$$

is chosen as $$u=b_1w^{n-1}+b_2w^{n-2}+\ldots+b_{n-1}w^1+b_nw^0,$$

because this equation converts the n elements of b from base w to base 10 which is more suitable for communication purposes. Thus, the unique number u is recreated using the apparatus 70 of FIG. 2, and can be input to the pseudo-random number generator.

In the example shown in FIG. 3, t=4 (there are 4 peaks), p=q=4 (a 4×4 detection grid is defined), and n=4 (4 filters are displayed sequentially). Thus, in this example, the unique number u would be capable of representing $455^4$ or $4.3\times 10$ values.

This embodiment of the invention has the advantage of requiring only a binary search for correlation peaks, without regard to their intensity. It will thus be more resistant to any variations in the correlation peak heights caused by the correlator system noise.

A further embodiment of the invention would use the combination of peak height and location to generate the unique number, u, using the procedures described herein.

It will be apparent to those skilled in the art that input systems other than system 29 of FIG. 1 and 129 of FIG. 2 are available in order to produce a fingerprint information beam. Some of these other systems do not require a laser.

While it is preferred that the input to the input system is the fingerprint(s) of a user, the input system could be adapted to produce an optical signal impressed with characteristics from other body parts, such as a user's hand or iris.

While the system of FIG. 2 has been described in conjunction with an optical correlator 142, it will be apparent to those skilled in the art that the correlator may be implemented digitally.

Other modifications will be apparent to those skilled in the art and, accordingly, the invention is defined in the claims.

What is claimed is:

1. A public key cryptographic system, comprising:
   a body part input for generating an optical information signal impressed with characteristics of a body part;
   Fourier transform means along a path of said optical information signal to obtain a Fourier transform representation of said information signal;
   a programmable filter responsive to said Fourier transform means for filtering said Fourier transform representation of said information signal to obtain a filtered Fourier transform representation;
   means for reading data from a data carrier storing filter information and for programming said programmable filter with said filter information data;
   inverse transform means responsive to said filter to inverse Fourier transform said filtered Fourier transform representation to obtain an inverse transform representation;
   key generating means responsive to said inverse transform means for generating a private key for decrypting a public key encrypted message.

2. The public key cryptographic system of claim 1 wherein said key generating means comprises means to generate a seed number from said inverse transform representation, a pseudo-random number generator responsive to said seed number generator, and a key generator responsive to said pseudo-random number generator and said seed number generator.

3. The public key cryptographic system of claim 2 including means for storing filter information on a data carrier, comprising:
   means to obtain an image of a body part;
   image based seed number generation means to generate said seed number based on said image;
   means to generate an array based on said seed number;
   means for obtaining a Fourier transform of said image,
   means for generating filter information based on said Fourier transform and said array; and
   means for storing said filter information on a card.

4. The public key cryptographic system of claim 3 including user controlled selection means and wherein said key generating means is responsive to said selection means for selectively generating one of said private key for decrypting a message and a public key for encrypting a message.

5. The public key cryptographic system of claim 4 including a public key decryption system for storing an encrypted message and, responsive to any private key generated by said key generating means, for attempting to decrypt said encrypted message with said private key.

6. The public key cryptographic system of claim 5 including public key input means for direct input of a public key to a public key encryption system, said public key encryption system for storing a plain text message and, responsive to any public key input to said public key input means, for encrypting said plain text message with said public key.

7. The public key cryptosystem of claim 3 wherein said body part input comprises a fingerprint input for receiving at least one finger of a user.

8. The public key cryptographic system of claim 7 wherein said data reading means comprises a card reader.

9. The public key cryptosystem of claim 7 wherein said Fourier transform means comprises a Fourier transform lens, said programmable filter comprises a programmable spatial light modulator, and said inverse transform means comprises a lens.

10. The public key cryptographic system of claim 3 wherein said data reading means is also for reading data from a data carrier storing an indication of a intensity of a component of an inverse Fourier transform and wherein said seed number generator is responsive to said data reading means to generate a seed number from said intensity indication as well as from said inverse transform.

11. A public key cryptographic system, comprising:
   a body part input for generating an optical information signal along a path impressed with characteristics of a body part;
   means in said information signal path to optically Fourier transform said information signal to provide a Fourier transformed optical information signal along a path;

a programmable optical filter in said Fourier transformed optical information signal path for providing a filtered Fourier transformed optical information signal along a path;

means for reading data from a data carrier storing filter information and for programming said programmable optical filter with said filter information data;

means in said filtered Fourier transformed optical information signal path to optically inverse Fourier transform said filtered Fourier transformed optical information signal and to provide an inverse transform signal along a signal path;

means responsive to said inverse transform signal for generating a private key for decrypting a public key encrypted message.

12. The public key cryptographic system of claim 11 wherein said programmable optical filter comprises a spatial light modulator.

13. The public key cryptographic system of claim 11 including means for storing filter information on a data carrier, comprising:

a second body part input for generating an optical information signal along a path impressed with characteristics of a body part;

means to detect said optical information signal;

means responsive to said detection means to generate said seed number and an array based on said seed number;

means responsive to said detection means and said seed number and array generation means for obtaining a Fourier transform of said image and for generating filter information; and means for storing said filter information on a card.

14. A public key cryptographic system, comprising:

a light source having a beam path;

a serially arranged prism, optical correlator, and sensor in said beam path, said optical correlator comprising a programmable spatial light modulator;

a card reader;

a pseudo-random number generator;

a private key generator connected to an output from said pseudo-random number generator;

a digital to analog converter connected between an output from said card reader and an input to said programmable spatial light modulator; and a seed number generator connected to (i) an output from said card reader (ii) an output from said sensor, (iii) an input to said pseudo-random number generator, and (iv) an input to said private key generator.

15. The public key cryptographic system of claim 14 including:

a second light source having a second beam path;

a serially arranged prism and detector in said second beam path;

a seed number and array generator connected to said detector;

a filter generator connected to said detector and said seed number and array generator; and a card storage device connected to said filter generator.

16. The public key cryptographic system of claim 14 wherein said optical correlator further comprises a Fourier transform lens interposed between said prism and said spatial light modulator and an inverse Fourier transform lens interposed between said spatial light modulator and said sensor.

17. A method for generating a private key for use in decrypting a public key encrypted message, comprising the steps of:

generating an optical information signal impressed with characteristics of a body part;

obtaining a Fourier transform representation of said information signal;

receiving a filter and filtering said Fourier transform representation of said information signal with said filter to obtain a filtered Fourier transform representation;

obtaining an inverse Fourier transform representation of said filtered Fourier transform representation;

generating a private key from said inverse transform representation for decrypting a public key encrypted message.

* * * * *